United States Patent
An et al.

(10) Patent No.: US 7,209,290 B2
(45) Date of Patent: Apr. 24, 2007

(54) DIFFRACTIVE THIN-FILM PIEZOELECTRIC MICROMIRROR AND METHOD OF PRODUCING THE SAME

(75) Inventors: Seung-Do An, Kyunggi-do (KR); Sang Kyeong Yun, Kyunggi-do (KR); Jong-Hyeong Song, Kyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 184 days.

(21) Appl. No.: 10/938,133

(22) Filed: Sep. 10, 2004

(65) Prior Publication Data
US 2005/0264888 A1 Dec. 1, 2005

(30) Foreign Application Priority Data
May 25, 2004 (KR) ............... 10-2004-0037536

(51) Int. Cl.
*G02B 6/26* (2006.01)

(52) U.S. Cl. .............. 359/572; 359/230; 359/579; 359/584

(58) Field of Classification Search ............... 359/230, 359/231, 572, 573, 579, 578, 584
See application file for complete search history.

(56) References Cited

U.S. PATENT DOCUMENTS

| | | | |
|---|---|---|---|
| 6,329,738 B1* | 12/2001 | Hung et al. .............. | 310/309 |
| 6,917,352 B2* | 7/2005 | Makino ................... | 345/84 |
| 2004/0252936 A1* | 12/2004 | Despont et al. .......... | 385/18 |

* cited by examiner

*Primary Examiner*—Fayez G. Assaf
(74) *Attorney, Agent, or Firm*—Chistensen O'Connor Johnson Kindness PLLC

(57) ABSTRACT

Disclosed is a diffractive micromirror and a method of producing the same. More particularly, the present invention pertains to a diffractive micromirror, in which a recess having a desired depth and width is precisely formed in a piezoelectric operation manner, and a method of producing the same.

12 Claims, 15 Drawing Sheets

DIFFRACTIVE THIN-FILM PIEZOELECTRIC MICROMIRROR AND METHOD OF PRODUCING THE SAME

BACKGROUND OF THE INVENTION

1. Field of the Invention

The present invention relates, in general, to a diffractive micromirror and a method of producing the same and, more particularly, to a diffractive micromirror, in which a recess having a desired depth and width is precisely formed in a piezoelectric operation manner, and a method of producing the same.

2. Description of the Prior Art

Generally, an optical signal processing technology has advantages in that a great amount of data is quickly processed in a parallel manner, unlike a conventional digital information processing technology, in which it is impossible to process a great amount of data in real-time, and studies have been conducted on the design and production of a binary phase-only filter, an optical logic gate, a light amplifier, an image processing technique, an optical device, and a light modulator using a spatial light modulation theory.

Of these, the spatial light modulator is applied to optical memory, optical display, printer, optical interconnection, and hologram fields, and studies have been conducted to develop a display employing it.

The spatial light modulator is embodied by a reflective deformable grating light modulator 10 as shown in FIG. 1. The modulator 10 is disclosed in U.S. Pat. No. 5,311,360 by Bloom et al. The modulator 10 includes a plurality of reflective deformable ribbons 18, which have reflective surface parts, are suspended on an upper part of a substrate 16, and are spaced apart from each other at regular intervals. An insulating layer 11 is deposited on the silicon substrate 16. Subsequently, a sacrificial silicon dioxide film 12 and a low-stress silicon nitride film 14 are deposited.

The nitride film 14 is patterned by the ribbons 18, and a portion of the silicon dioxide film 12 is etched, thereby maintaining the ribbons 18 on an oxide spacer layer 12 by a nitride frame 20.

In order to modulate light having a single wavelength of $\lambda_o$, the modulator is designed so that thicknesses of the ribbon 18 and oxide spacer 12 are each $\lambda_o/4$.

Limited by a vertical distance (d) between a reflective surface 22 of each ribbon 18 and a reflective surface of the substrate 16, a grating amplitude of the modulator 10 is controlled by applying a voltage between the ribbon 18 (the reflective surface 22 of the ribbon 18 acting as a first electrode) and the substrate 16 (a conductive layer 24 of a lower side of the substrate 16 acting as a second electrode).

In its undeformed state, with no voltage application, the grating amplitude is $\lambda_o/2$, and a total round-trip path difference between light beams reflected from the ribbon and substrate is one wavelength $\lambda_o$, and thus, a phase of reflected light is reinforced.

Accordingly, in its undeformed state, the modulator 10 acts as a plane mirror when it reflects light. In FIG. 2, a reference numeral 20 denotes incident light and reflected light in its undeformed state.

When a proper voltage is applied between the ribbon 18 and substrate 16, the electrostatic force enables the ribbon 18 to be moved downward toward a surface of the substrate 16. At this time, the grating amplitude is changed to $\lambda_o/4$. The total round-trip path difference is a half of a wavelength, and light reflected from the deformed ribbon 18 and light reflected from the substrate 16 are subjected to destructive interference.

The modulator diffracts incident light 26 resulting from the interference. In FIG. 3, reference numerals 28 and 30 denote light beams diffracted in a +/− diffractive mode (D+1, D−1) in a deformed state.

However, the Bloom's light modulator adopts an electrostatic method to control a position of the micromirror, which has disadvantages in that an operating voltage is relatively high (usually, 30 V or so) and a correlation between the applied voltage and displacement is not linear, resulting in poor reliability in the course of controlling light.

FIG. 4 is a cross-sectional view of a recess-type thin-film piezoelectric light modulator according to a conventional technology.

Referring to FIG. 4, the recess-type thin-film piezoelectric light modulator according to the conventional technology includes a silicon substrate 401 and elements 410.

In this regard, the elements 410, which have predetermined widths and are arranged at regular intervals, constitute the recess-type thin-film piezoelectric light modulator. Additionally, the elements 410 may be spaced apart from each other at regular intervals (each interval is almost the same as the width of each element 410), in which a micromirror layer formed on an upper side of the silicon substrate 401 reflects incident light to diffract it.

The silicon substrate 401 has a recess to provide an air space to each element 410, an insulating layer 402 is deposited on an upper surface of the substrate, and ends of the elements 410 are attached to upper sides of a wall of the recess.

The elements 410 each have a rod shape, and lower sides of ends of the elements are attached to the remaining upper side of the substrate 401 except for the recess so that the centers of the elements are spaced from the recess of the silicon substrate 401. Additionally, each element 410 includes a lower supporter 411 which has a vertically movable portion corresponding in position to the recess of the silicon substrate 401.

Furthermore, the element 410 is laminated on a left end of the lower supporter 411, and includes a lower electrode layer 412 for providing a piezoelectric voltage, a piezoelectric material layer 413 which is laminated on the lower electrode layer 412 and shrunken and expanded when a voltage is applied to both sides thereof to generate upper and lower driving forces, and an upper electrode layer 414 which is laminated on the piezoelectric material layer 413 and provides a piezoelectric voltage to the piezoelectric material layer 413.

Furthermore, the element 410 is laminated on a right end of the lower supporter 411, and includes a lower electrode layer 412' for providing a piezoelectric voltage, a piezoelectric material layer 413' which is laminated on the lower electrode layer 412' and shrunken and expanded when a voltage is applied to both sides thereof to generate upper and lower driving forces, and an upper electrode layer 414' which is laminated on the piezoelectric material layer 413' and provides a piezoelectric voltage to the piezoelectric material layer 413'.

Additionally, Korean Pat. Application No. P2003-077389 describes an extrusion type as well as the recess type, and a method of producing the same in detail.

FIGS. 5a to 5j illustrate fabrication of a recess-type thin-film piezoelectric micromirror according to a conventional technology.

Referring to FIG. 5a, a mask layer 502 is formed in a thickness of 0.1–1.0 μm through a thermal oxidation process on a silicon wafer 501, and then patterned for silicon etching.

With reference to FIG. 5b, the silicon is etched using a solution capable of etching the silicon, such as TMAH or KOH, in a predetermined thickness, and the mask layer 502 is then removed.

Referring to FIG. 5c, an insulating and etching prevention layer 503 is formed on the etched silicon according to the thermal oxidation process. That is to say, the insulating and etching prevention layer 503, such as $SiO_2$, is formed on a surface of the silicon wafer.

Referring to FIG. 5d, a polysilicon (Poly-Si) or an amorphous-Si is deposited on an etched portion of the silicon wafer 501 according to low pressure chemical vapor deposition (LPCVD) or plasma chemical vapor deposition (PECVD) processes to form an air space to form a sacrificial layer 504, and the resulting silicon wafer is polished to flatten a surface thereof. In this respect, in the case of using a silicon on insulator (SOI), the deposition of the polysilicon and polishing may be omitted.

Subsequently, silicon nitrides, such as $Si_3N_4$, are deposited in a preferable thickness of 0.1–5.0 μm according to the LPCVD or PECVD processes, and $SiO_2$ is deposited in a thickness of 0.1–5 μm according to thermal oxidation or PECVD processes, but this procedure may be omitted according to necessity.

Referring to FIG. 5e, a lower supporter 505 for supporting the piezoelectric material is deposited on the silicon wafer 501, and a material constituting the lower supporter 505 may be exemplified by Si oxides (e.g. $SiO_2$, etc.), Si nitrides (e.g. $Si_3N_4$, etc.), ceramic substrates (Si, $ZrO_2$, $Al_2O_3$ and the like), and Si carbides. The lower supporter 505 may be omitted, if necessity.

Referring to FIG. 5f, a lower electrode 506 is formed on the lower supporter 505, examples of material for the lower electrode 506 may include Pt, Ta/Pt, Ni, Au, Al, $RuO_2$ and the like, and the material is deposited in a thickness of 0.01–3 μm using sputtering or evaporation processes.

Referring to FIG. 5g, a piezoelectric material 507 is formed in a thickness of 0.01–20.0 μm on the lower electrode 506 according to a wet process (screen printing, sol-gel coating and the like) and a dry process (sputtering, evaporation, vapor deposition and the like). Additionally, all of the upper and lower piezoelectric materials and left and right piezoelectric materials may be used as the piezoelectric material 507, examples of the piezoelectric material may include PzT, PNN-PT, ZnO and the like, and the piezoelectric electrolytic material contains at least one selected from the group consisting of Pb, Zr, Zn, or titanium.

Referring to FIG. 5h, an upper electrode 508 is formed on the piezoelectric material 507, a material of the upper electrode may be exemplified by Pt, Ta/Pt, Ni, Au, Al, and $RuO_2$, and the upper electrode is formed in a thickness of 0.01–3 μm using the sputtering or evaporation processes.

Referring to FIG. 5i, a micromirror 509 is attached to the upper electrode 508, and examples of a material of the micromirror include a light-reflective material, such as Ti, Cr, Cu, Ni, Al, Au, Ag, Pt, and Au/Cr.

At this time, the upper electrode 508 may be used as the micromirror, or a separate micromirror may be deposited on the upper electrode 508.

Referring to FIG. 5j, after such a mother body of a diffractive thin-film piezoelectric micromirror array is patterned using a mask layer, such as a photoresist, the micromirror 509, upper electrode 508, piezoelectric material 507, lower electrode 506, and lower supporter 505 are etched to form the diffractive thin-film piezoelectric micromirror array. Subsequently, the sacrificial layer 504 is etched using $XeF_2$ gas.

Heretofore, there has been described removal of the sacrificial layer 504 after the diffractive thin-film piezoelectric micromirror array is formed from the mother body of the diffractive thin-film piezoelectric micromirror array, but the micromirror array may be formed after the sacrificial layer 504 is removed.

In other words, a hole is formed in a portion of the mother body of the diffractive thin-film piezoelectric micromirror array, in which the lower supporter 505 is not formed, the sacrificial layer 504 is etched using $XeF_2$ gas, the mother body of the diffractive thin-film piezoelectric micromirror array is patterned using the mask layer, such as the photoresist, and the micromirror 509, upper electrode 508, piezoelectric material 507, lower electrode 506, and lower supporter 505 are etched to form the micromirror array.

Meanwhile, the conventional diffractive thin-film piezoelectric light modulator is problematic in that it is difficult to control a thickness in the course of polishing the polysilicon. That is to say, a dispersion of a setting time for each ribbon in a chip is undesirably high.

Furthermore, the conventional diffractive thin-film piezoelectric light modulator is disadvantageous in that a depth of a cavity is ±0.5 μm, and it is impossible to control the depth of the cavity to 0.5 μm or less.

SUMMARY OF THE INVENTION

Therefore, the present invention has been made keeping in mind the above disadvantages occurring in the prior arts, and an object of the present invention is to provide a diffractive micromirror, in which an oxide wall capable of defining a width and a depth of a cavity is formed to form the cavity having the desired width and depth, and a method of producing the same.

The above object can be accomplished by providing a diffractive thin-film piezoelectric micromirror, including a substrate on which a groove having walls perpendicular to a bottom thereof is longitudinally formed at a center thereof. A piezoelectric mirror layer has a ribbon shape, and is attached to an upper side of the substrate along both ends of the groove at both ends thereof while being spaced from the bottom of the groove at a center portion thereof, and diffracts an incident light beam. At this time, the center portion is vertically movable when a voltage is applied to the piezoelectric mirror layer.

Additionally, the present invention provides a diffractive thin-film piezoelectric micromirror, including a substrate on which a groove having walls perpendicular to a bottom thereof is longitudinally formed at a center thereof. A lower supporter has a ribbon shape, and is attached to an upper side of the substrate along both ends of the groove at both ends thereof while being spaced from the bottom of the groove at a center portion thereof. At this time, the center portion is vertically movable. A piezoelectric mirror layer is laminated on the lower supporter so as to be positioned on the groove of the substrate at both ends thereof, and diffracts an incident light beam. In this regard, the both end portions of the piezoelectric mirror layer, which is spaced from the groove, are vertically movable when a voltage is applied to the piezoelectric mirror layer.

Further, the present invention provides a diffractive thin-film piezoelectric micromirror, including a substrate on which a groove having walls perpendicular to a bottom thereof is longitudinally formed at a center thereof. A lower supporter has a ribbon shape and is attached to an upper side of the substrate along both ends of the groove at both ends thereof while being spaced from the bottom of the groove of the substrate at a center portion thereof. A first piezoelectric layer is positioned on an end of the lower supporter at an end thereof and on a location remote from a center of the lower supporter toward the end of the lower supporter by a predetermined distance at the other end thereof, and shrunken and expanded so as to be vertically moved when a voltage is applied thereto. A second piezoelectric layer is positioned on the other end of the lower supporter at an end thereof and on a location remote from the center of the lower supporter toward the other end of the lower supporter by a predetermined distance at the other end thereof, and shrunken and expanded so as to be vertically moved when a voltage is applied thereto. A micromirror layer is positioned at the center of the lower supporter and diffracts an incident light beam.

Furthermore, the present invention provides a method of producing a diffractive thin-film piezoelectric micromirror, which comprises a first step of forming an insulating layer in a substrate so that the insulating layer have a predetermined thickness from a predetermined depth of the substrate; a second step of laminating a mask on the substrate and subsequently forming oxidized walls; a third step of forming a piezoelectric layer on the substrate and patterning the piezoelectric layer to produce a diffractive thin-film piezoelectric micromirror array; and a fourth step of removing a sacrificial layer positioned on the insulating layer to complete production of the diffractive thin-film piezoelectric micromirror array.

As well, the present invention provides a method of producing a diffractive thin-film piezoelectric micromirror, which comprises a first step of forming an insulating layer in a substrate so that the insulating layer have a predetermined thickness from a predetermined depth of the substrate; a second step of laminating a mask on the substrate and subsequently forming oxidized walls; a third step of forming a piezoelectric layer on the substrate and removing a sacrificial layer positioned on the insulating layer; and a fourth step of patterning the piezoelectric layer to produce a diffractive thin-film piezoelectric micromirror array.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
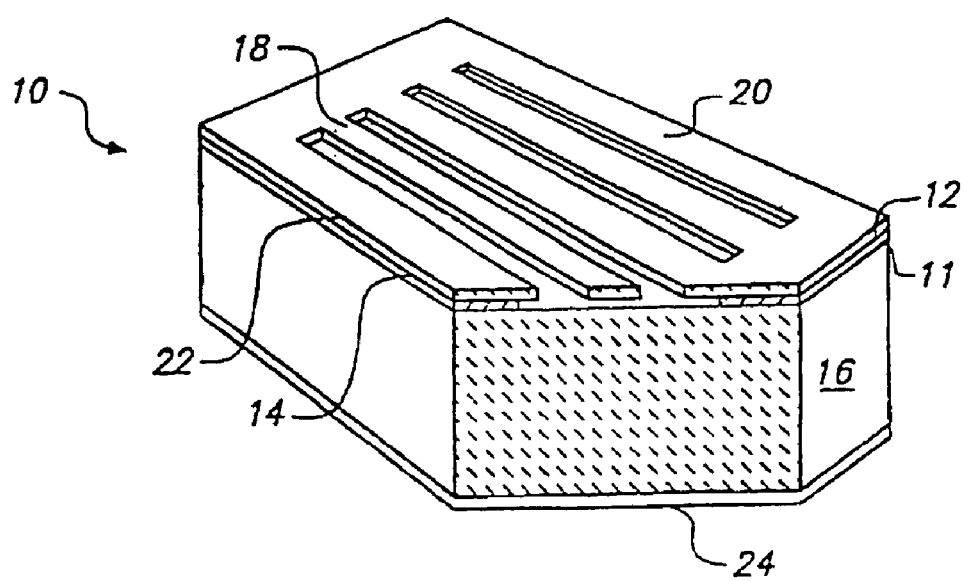
FIG. 1 illustrates an electrostatic-type grating light modulator according to a conventional technology.
Figure 2:
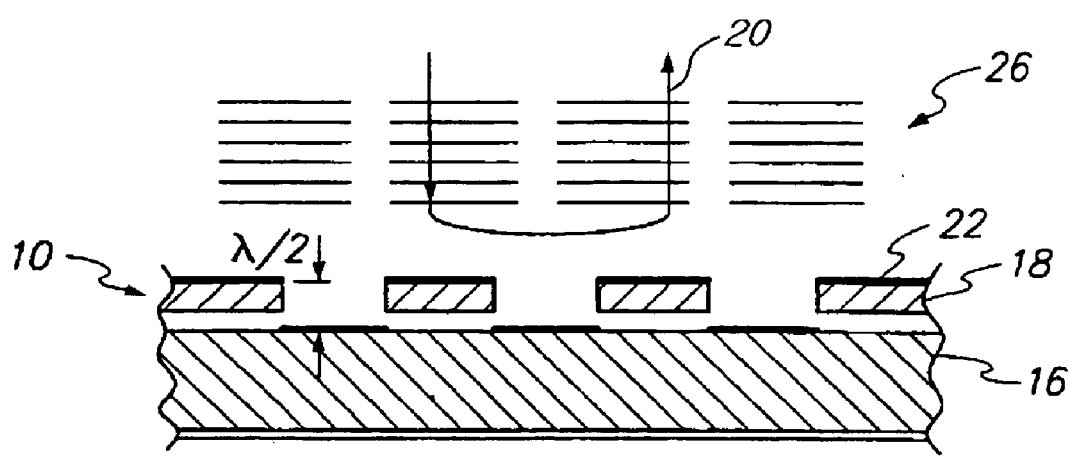
FIG. 2 illustrates reflection of incident light by the electrostatic-type grating light modulator according to a conventional technology in an undeformed state.
Figure 3:
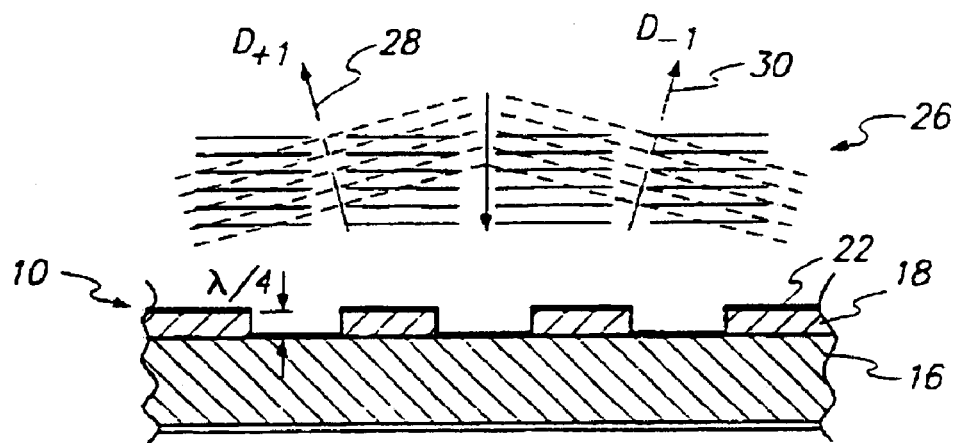
FIG. 3 illustrates diffraction of incident light by the grating light modulator according to a conventional technology in a deformed state caused by an electrostatic force.
Figure 4:
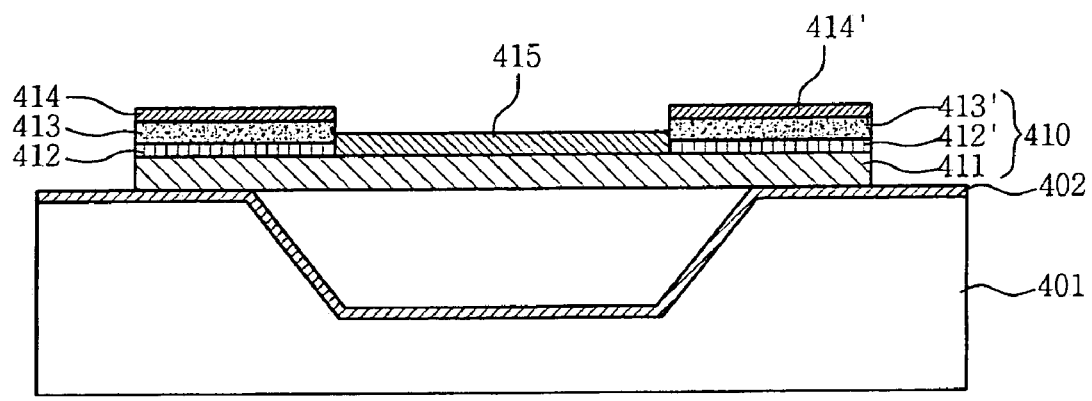
FIG. 4 is a cross-sectional view of a diffractive thin-film piezoelectric micromirror which has a piezoelectric material and a recess.

FIG. 4 is a cross-sectional view of a recess-type thin-film piezoelectric light modulator. The recess-type thin-film piezoelectric light modulator includes a silicon substrate 401 and elements 410.

In this regard, the elements 410, which have predetermined widths and are arranged at regular intervals, constitute the recess-type thin-film piezoelectric light modulator. Additionally, the elements 410 may be spaced apart from each other at regular intervals (each interval is almost the same as the width of each element 410), in which a micromirror layer formed on an upper side of the silicon substrate 401 reflects incident light to diffract it.

The silicon substrate 401 has a recess to provide an air space to each element 410, an insulating layer 402 is deposited on an upper surface of the substrate, and ends of the elements 410 are attached to upper sides of a wall of the recess.

The elements 410 each have a rod shape, and lower sides of ends of the elements are attached to the remaining upper side of the substrate 401 except for the recess so that the centers of the elements are spaced from the recess of the silicon substrate 401. Additionally, each element 410 includes a lower supporter 411 which has a vertically movable portion corresponding in position to the recess of the silicon substrate 401.

Furthermore, the element 410 is laminated on a left end of the lower supporter 411, and includes a lower electrode layer 412 for providing a piezoelectric voltage, a piezoelectric material layer 413 which is laminated on the lower electrode layer 412 and shrunken and expanded when a voltage is applied to both sides thereof to generate upper and lower driving forces, and an upper electrode layer 414 which is laminated on the piezoelectric material layer 413 and provides a piezoelectric voltage to the piezoelectric material layer 413.

Furthermore, the element 410 is laminated on a right end of the lower supporter 411, and includes a lower electrode layer 412' for providing a piezoelectric voltage, a piezoelectric material layer 413' which is laminated on the lower electrode layer 412' and shrunken and expanded when a voltage is applied to both sides thereof to generate upper and lower driving forces, and an upper electrode layer 414' which is laminated on the piezoelectric material layer 413' and provides a piezoelectric voltage to the piezoelectric material layer 413'.

FIGS. 5a to 5j illustrate fabrication of a recess-type thin-film piezoelectric micromirror. A mask layer 502 is formed in a thickness of 0.1–1.0 μm through a thermal oxidation process on a silicon wafer 501, and then patterned for silicon etching.

Figure 5A:
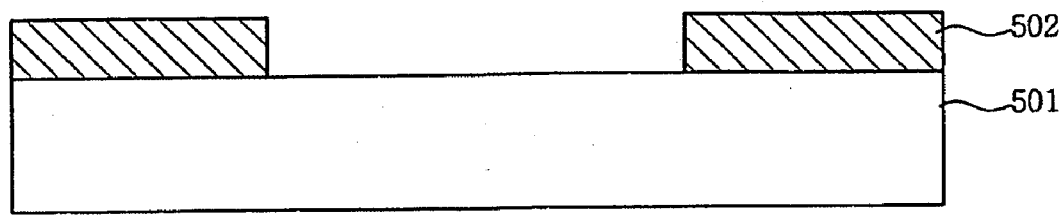
FIGS. 5a to 5j illustrate fabrication of a recess-type thin-film piezoelectric micromirror.
Figure 5B:
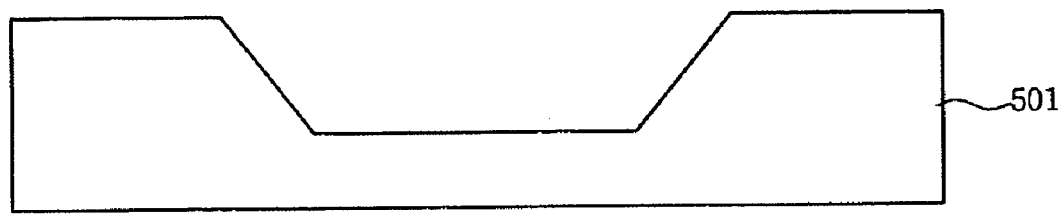

With reference to FIG. 5b, the silicon is etched using a solution capable of etching the silicon, such as TMAH or KOH, in a predetermined thickness, and the mask layer 502 is then removed.

Figure 5C:
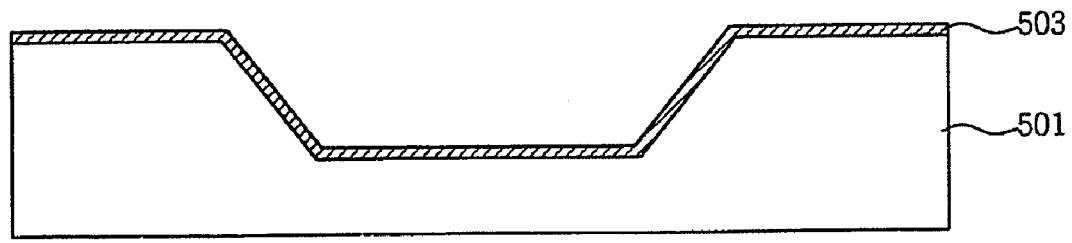

Referring to FIG. 5c, an insulating and etching prevention layer 503 is formed on the etched silicon according to the thermal oxidation process. That is to say, the insulating and etching prevention layer 503, such as SiO2, is formed on a surface of the silicon wafer.

Figure 5D:
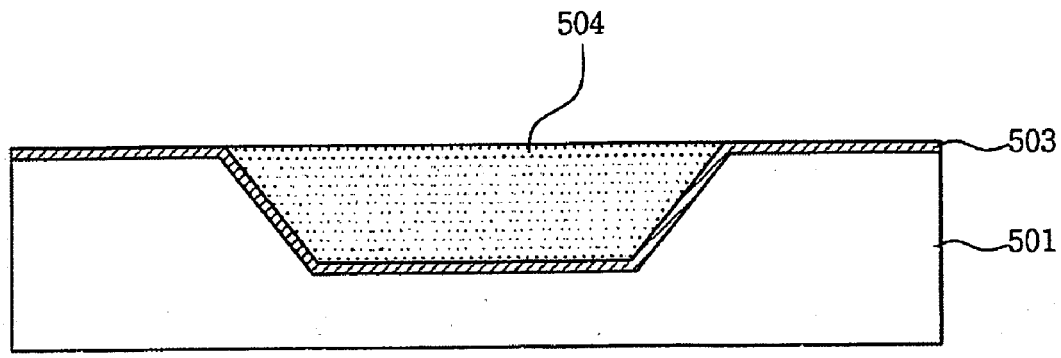

Referring to FIG. 5d, a polysilicon (Poly-Si) or an amorphous-Si is deposited on an etched portion of the silicon wafer 501 according to low pressure chemical vapor deposition (LPCVD) or plasma chemical vapor deposition (PECVD) processes to form an air space to form a sacrificial layer 504, and the resulting silicon wafer is polished to flatten a surface thereof. In this respect, in the case of using a silicon on insulator (SOI), the deposition of the polysilicon and polishing may be omitted.

Subsequently, silicon nitrides, such as Si3N4, are deposited in a preferable thickness of 0.1–5.0 μm according to the LPCVD or PECVD processes, and SiO2 is deposited in a thickness of 0.1–5 μm according to thermal oxidation or PECVD processes, but this procedure may be omitted according to necessity.

Figure 5E:
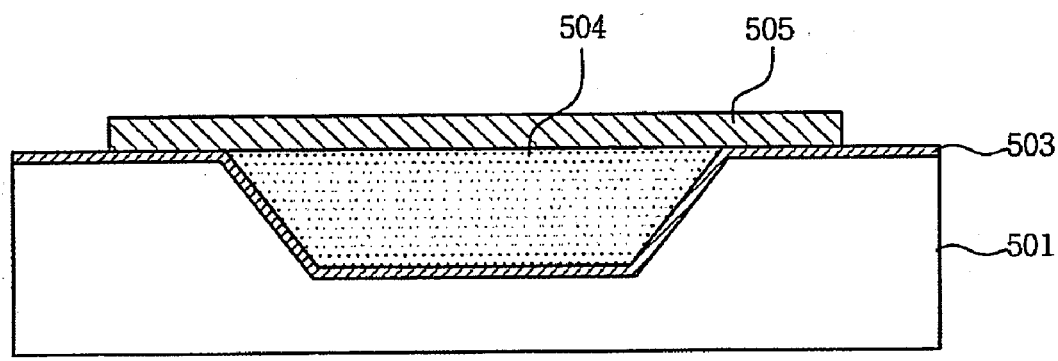

Referring to FIG. 5e, a lower supporter 505 for supporting the piezoelectric material is deposited on the silicon wafer 501, and a material constituting the lower supporter 505 may be exemplified by Si oxides (e.g. SiO2, etc.), Si nitrides (e.g. Si3N4, etc.), ceramic substrates (Si, ZrO2, Al2O3 and the like), and Si carbides. The lower supporter 505 may be omitted, if necessity.

Figure 5F:
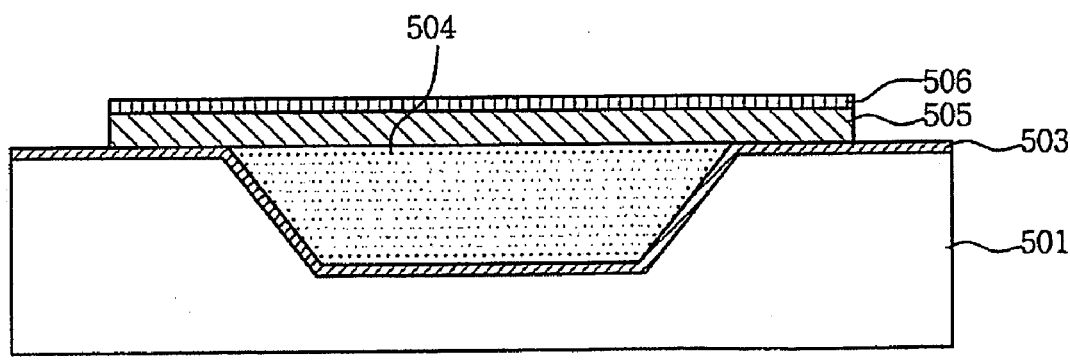

Referring to FIG. 5f, a lower electrode 506 is formed on the lower supporter 505, examples of material for the lower electrode 506 may include Pt, Ta/Pt, Ni, Au, Al, RuO2 and the like, and the material is deposited in a thickness of 0.01–3 μm using sputtering or evaporation processes.

Figure 5G:
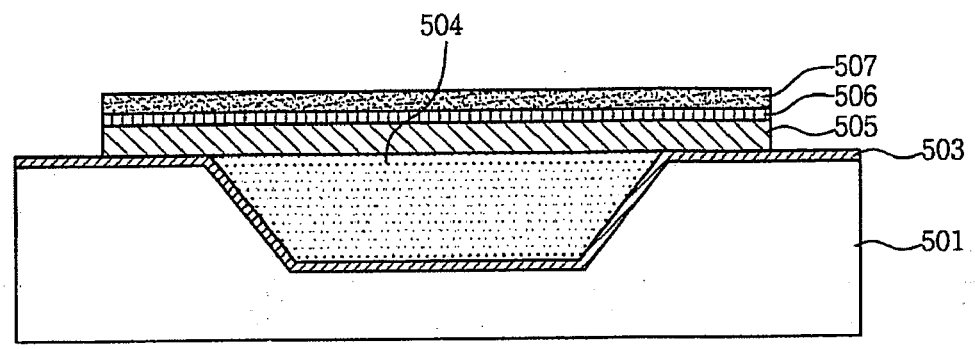

Referring to FIG. 5g, a piezoelectric material 507 is formed in a thickness of 0.01–20.0 μm on the lower electrode 506 according to a wet process (screen printing, sol-gel coating and the like) and a dry process (sputtering, evaporation, vapor deposition and the like). Additionally, all of upper and lower piezoelectric materials and left and right piezoelectric materials may be used as the piezoelectric material 507, examples of the piezoelectric material may include PzT, PNN-PT, ZnO and the like, and the piezoelectric electrolytic material contains at least one selected from the group consisting of Pb, Zr, Zn, or titanium.

Figure 5H:
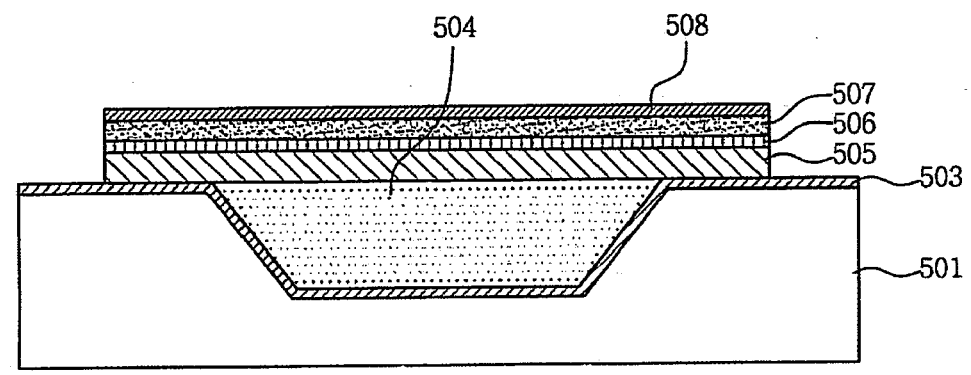

Referring to FIG. 5h, an upper electrode 508 is formed on the piezoelectric material 507, a material of the upper electrode may be exemplified by Pt, Ta/Pt, Ni, Au, Al, and RuO2, and the upper electrode is formed in a thickness of 0.01–3 μm using the sputtering or evaporation processes.

Figure 5I:
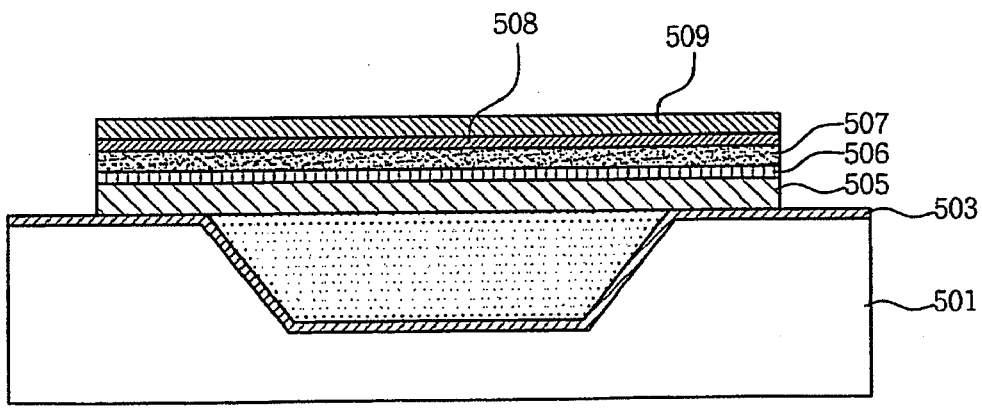

Referring to FIG. 5i, a micromirror 509 is attached to the upper electrode 508, and examples of a material of the micromirror include a light-reflective material, such as Ti, Cr, Cu, Ni, Al, Au, Ag, Pt, and Au/Cr.

At this time, the upper electrode 508 may be used as the micromirror, or a separate micromirror may be deposited on the upper electrode 508.

Figure 5J:
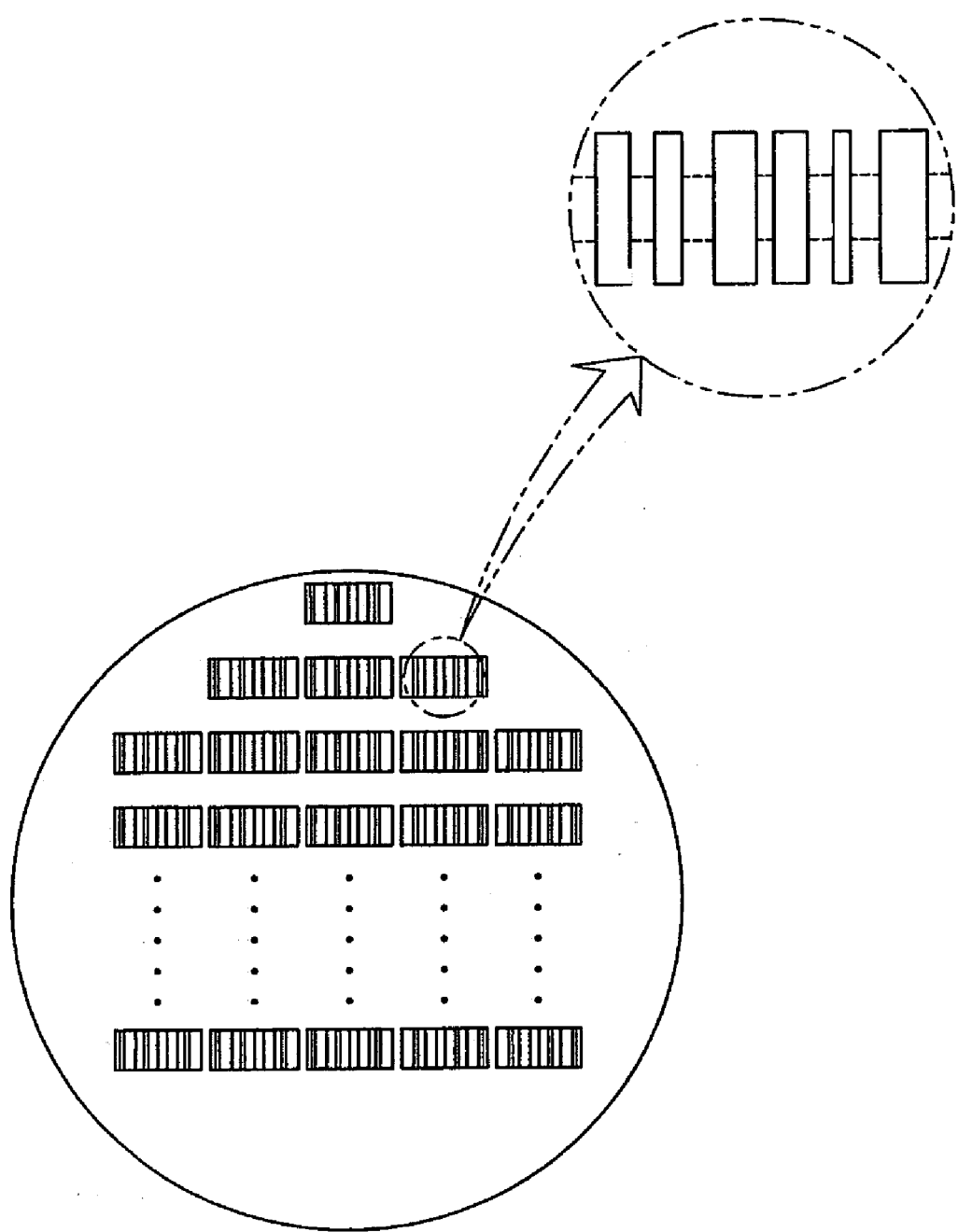

Referring to FIG. 5j, after such a mother body of a diffractive thin-film piezoelectric micromirror array is patterned using a mask layer, such as a photoresist, the micromirror 509, upper electrode 508, piezoelectric material 507, lower electrode 506, and lower supporter 505 are etched to form the diffractive thin-film piezoelectric micromirror array. Subsequently, the sacrificial layer 504 is etched using XeF2 gas.

Heretofore, there has been described removal of the sacrificial layer 504 after the diffractive thin-film piezoelectric micromirror array is formed from the mother body of the diffractive thin-film piezoelectric micromirror array, but the micromirror array may be formed after the sacrificial layer 504 is removed.

In other words, a hole is formed in a portion of the mother body of the diffractive thin-film piezoelectric micromirror array, in which the lower supporter 505 is not formed, the sacrificial layer 504 is etched using XeF2 gas, the mother body of the diffractive thin-film piezoelectric micromirror array is patterned using the mask layer, such as the photoresist, and the micromirror 509, upper electrode 508, piezoelectric material 507, lower electrode 506, and lower supporter 505 are etched to form the micromirror array.

There are limitations in the above-described, diffractive thin-film piezoelectric light modulator. For example, it is difficult to control the thickness in the course of polishing the polysilicon. That is to say, a dispersion of a setting time for each ribbon in a chip is undesirably high. Also, in a diffractive thin-film piezoelectric light modulator it is difficult to control the depth of the cavity to within 0.5 μm or less.

FIGS. 6a to 6f illustrate production of a diffractive thin-film piezoelectric micromirror having a recess according to an embodiment of the present invention.

Figure 6A:
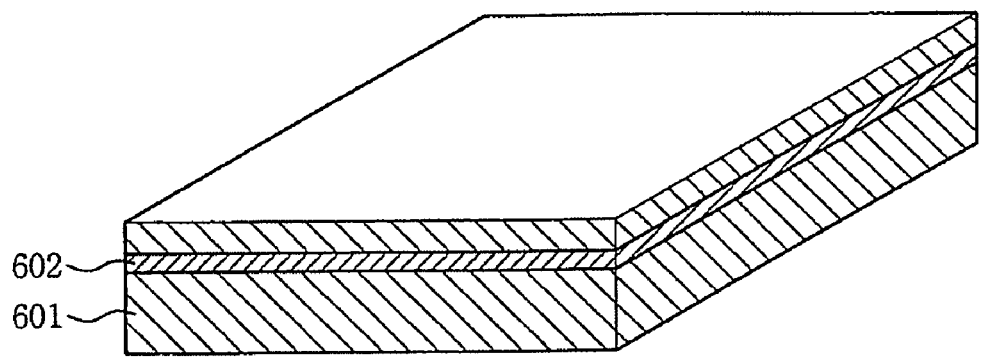
FIGS. 6a to 6f illustrate fabrication of a diffractive thin-film piezoelectric micromirror having a recess.

With reference to FIG. 6a, a silicon wafer 601 is prepared, and an insulating layer 602 is formed in such a way that the insulating layer occupies a space ranging from a first position, which is deep from a surface of the silicon wafer so as to form a cavity between the first position and the surface, to a second position that is deeper than the first position by a predetermined depth according to an ion implantation process.

The ion implantation process is a technology in which a substance, to be doped, is ionized, its movement is accelerated to enable the substance to have significantly increased kinetic energy, and the resulting substance is coercively implanted into a surface of the silicon wafer 601. It significantly reduces a horizontal doping in comparison with a heat diffusion process, thereby contributing to improved integration.

Generally, the ion implantation process has the following seven advantages: 1) it is possible to precisely control a concentration of implanted ions, 2) it is possible to produce a small-sized device because a horizontal dispersion is reduced, 3) it is possible to conduct an implantation of foreign substances having a high purity using a mass spectroscopy, 4) it is possible to achieve diversification of a concentration distribution through an implantation of superposed ions, 5) a doping concentration is uniform, 6) it is possible to use a photosensitive layer as a mask because the implantation is carried out at low temperatures, and 7) the foreign substances are reduced.

The insulating layer 602 is formed according to the ion implantation process, in other words, $O_2$ or $H_2O$ is implanted in such a way that the insulating layer occupies the space ranging from the first position, which is deep below the surface of the silicon wafer so as to form the cavity between the first position and the surface, to the second position that is deeper than the first position by a predetermined depth, and then heated to form the insulating layer. A depth of the cavity may be controlled to 0.5 μm or less by such a first ion implantation.

Figure 6B:
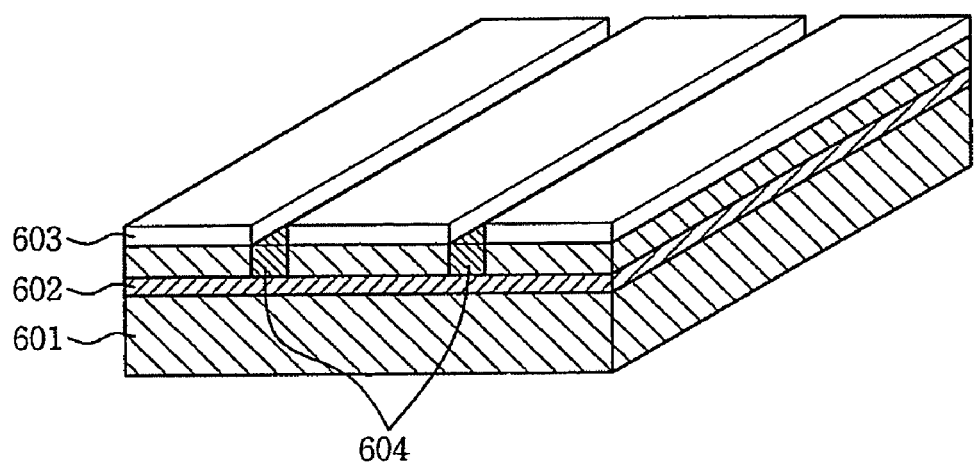

Referring to FIG. 6b, an ion exposure mask 603 having both exposed sides is laminated on the silicon wafer 601 to form oxidized walls defining both boundaries of a width of the cavity.

Oxygen ions are implanted through only the exposed sides of the ion exposure mask 603 to form desired boundaries of the cavity, thereby forming the oxidized walls 604 as shown in FIG. 6b.

A typical device for implanting the oxygen ions is equipped with an oxygen ion source, an accelerator, a mass spectroscope, a focusing lens, an x-y deflecting device, and a wafer mounting compartment. The oxygen ion source generates the oxygen ions, movement of the generated oxygen ions is accelerated by an electric field, and separation of the oxygen ions which are to be implanted is conducted by the mass spectroscope. To uniformly implant the oxygen ions into the silicon wafer 601, the oxygen ions must be implanted while being deflected, and thus, a deflecting device is needed. The focusing lens functions to control a width of a light beam. A current measuring device is needed to measure an oxygen ion current in the silicon wafer mounting compartment acting as a target into which the ions are to be implanted, and a total oxygen ion current to notice a dose of the implanted oxygen ions.

The device for implanting the ions is operated in a vacuum of $10^{-5}$–$10^{-7}$ Torr. An ion implanting system is divided into a medium current ion implanter, a high current ion implanter, a pre-implantation ion implanter, and a high energy ion implanter according to ion current and the intensity of energy.

In the specification of the present invention, the formation of the oxidized walls 604 employing the implantation of an oxidizing agent is disclosed, but alternatively the oxidized wall may be formed through an oxidation process using water and oxygen at high temperatures. Additionally, this alternative oxidation process is preferable because it is more competitive in terms of costs than the oxidant implantation process.

Figure 6C:
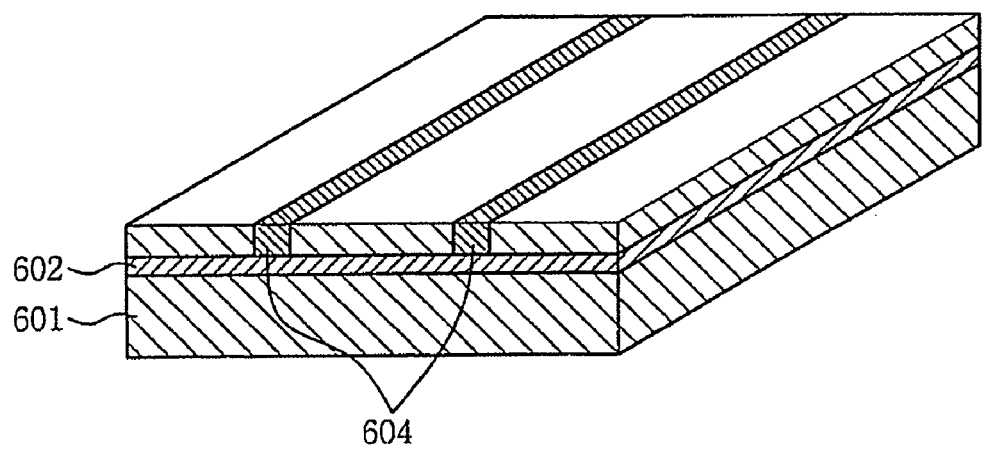

Referring to FIG. 6c, after the ion implanting is completed using an ion implanter to form the desired oxidized walls 604 on the silicon wafer 601, the ion exposure mask 603 is removed.

Figure 6D:
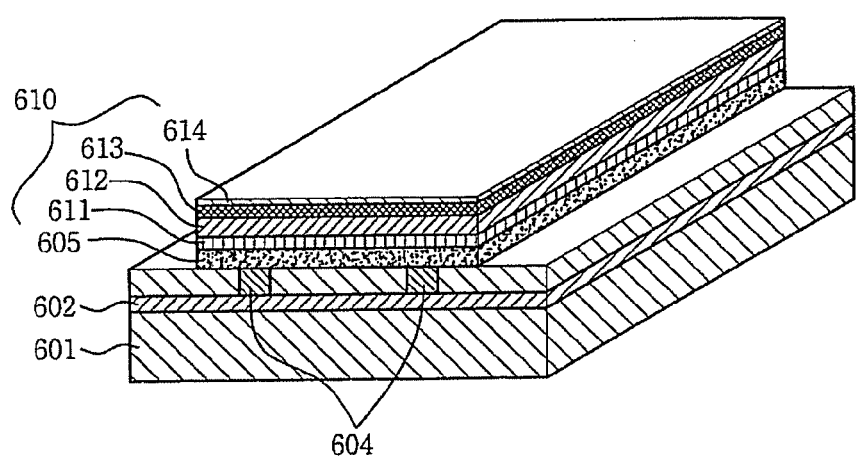

Referring to FIG. 6d, a lower supporter 605 for supporting the piezoelectric material is deposited on the silicon wafer 601, and a material constituting the lower supporter 605 may be exemplified by Si oxides (e.g. $SiO_2$, etc.), Si nitrides (e.g. $Si_3N_4$, etc.), ceramic substrates (Si, $ZrO_2$, $Al_2O_3$ and the like), and Si carbides. The lower supporter 605 may be omitted, if necessity.

Referring to FIG. 6d, a piezoelectric layer 610 is deposited on the lower supporter 605, and a lower electrode 611 constituting the piezoelectric layer 610 is firstly formed. At this time, examples of a material of the lower electrode 611 may include Pt, Ta/Pt, Ni, Au, Al, $RuO_2$ and the like, and the material is deposited in a thickness of 0.01–3 μm using sputtering or evaporation processes.

Referring to FIG. 6d, a piezoelectric material 612 is formed in a thickness of 0.01–20.0 μm on the lower electrode 611 using a wet process (screen printing, sol-gel coating and the like) and a dry process (sputtering, evaporation, vapor deposition and the like). Additionally, any of the upper and lower piezoelectric materials and left and right piezoelectric materials may be used as the piezoelectric material 612, examples of the piezoelectric material may include PzT, PNN-PT, ZnO and the like, and the piezoelectric electrolytic material contains at least one selected from the group consisting of Pb, Zr, Zn, and titanium.

Referring to FIG. 6d, an upper electrode 613 is formed on the piezoelectric material 612, a material of the upper electrode may be exemplified by Pt, Ta/Pt, Ni, Au, Al, and $RuO_2$, and the upper electrode is formed in a thickness of 0.01–3 μm using the sputtering or evaporation processes.

Referring to FIG. 6d, a micromirror 614 is attached to the upper electrode 613, and examples of a material for the micromirror include a light-reflective material, such as Ti, Cr, Cu, Ni, Al, Au, Ag, Pt, and Au/Cr.

At this time, the upper electrode 613 may be used as the micromirror, or a separate micromirror 614 may be deposited on the upper electrode 613.

Generally, a thin film frequently used to produce a semiconductor device means a thin metal, semiconductor, or nonconductor layer deposited using thermal growth, physical deposition, or chemical reaction processes. In the case of a thin film for a VLSI process, components and thickness must be controlled to be suitable for a sub-micron process, and defects, such as pinholes, must not exist. Two representative processes of producing the thin film are a chemical vapor deposition (CVD) process and a physical vapor deposition (PVD) process.

The formation of the thin film employing the CVD process is one of the most important processes in the course of producing the semiconductor device. The CVD process is advantageous in that an amorphous material as well as a crystalline layer having a high purity and no defects may be obtained at relatively low temperatures, various types of thin films may be formed, and a wide range of stoichiometric composition may be easily controlled.

A CVD device is classified according to pressure, temperature, energy source, and temperature of a wall acting as process variables, and must have the following basic functions. A first function includes implantation and measurement of reactant and diluent gases and a time control, a second function is to heat a substrate, on which a thin film is to be formed and to automatically control a temperature of the substrate, and a third function is to exhaust waste gases and safely remove them.

The CVD device must be designed so as to have a simple structure useful to execute the above functions. The thickness and composition ratio of the resulting thin film must be constant for each process, and the thin film must have no pinholes, cracks, and foreign substances. In the case of mass-production, economic efficiency in electric power and reactant gas consumption, a high output, stability, ease of maintenance and the like are further considered in the course of designing it. The CVD device is usually classified into atmospheric pressure and low pressure CVD devices according to internal pressure in the course of forming the thin film, and the atmospheric pressure CVD device is classified into low temperature and high temperature CVD devices according to a temperature range in the course of forming the thin film. An LPCVD device may be classified into hot wall and cold wall CVD devices. Additionally, there are plasma and photo CVD devices.

Meanwhile, the chemical vapor deposition process produces a thin film made of a desired substance through a chemical reaction, whereas the physical vapor deposition process applies energy to a desired thin film substance in a form of a substrate or a lump to physically separate the desired substances having kinetic energy, thereby depositing the separated substance on another substrate, resulting in accomplishment of the thin film. Usually, the physical vapor deposition process may be classified into sputtering and evaporation processes.

In the sputtering process, high energy particles are collided with a substrate made of the same material as the desired thin film to separate some atoms and molecules from the substrate, thereby creating a thin film. The sputtering process has the following advantages: 1) it is possible to form a uniform thickness of thin film in a broad area, 2) it is relatively easy to control a thickness of the thin film, 3) it is possible to more precisely control an alloy composition than a vacuum deposition process, 4) it is possible to control a step coverage, a particle structure, and a stress, 5) it is possible to conduct a desirable pretreatment, and 6) it is possible to avoid X-ray damage.

Furthermore, the evaporation process includes heating a material, which is to be deposited, in a vessel under a vacuum to increase vapor pressure, thereby depositing the material on a substrate. Since the deposition is proportional to the vapor pressure, the material must be deposited in a state of sufficiently high vapor pressure so as to be used in a practical VLSI process. Methods of heating the material to be deposited are classified into resistance heat deposition, electron beam deposition, and inductance heating deposition processes.

Figure 6E:
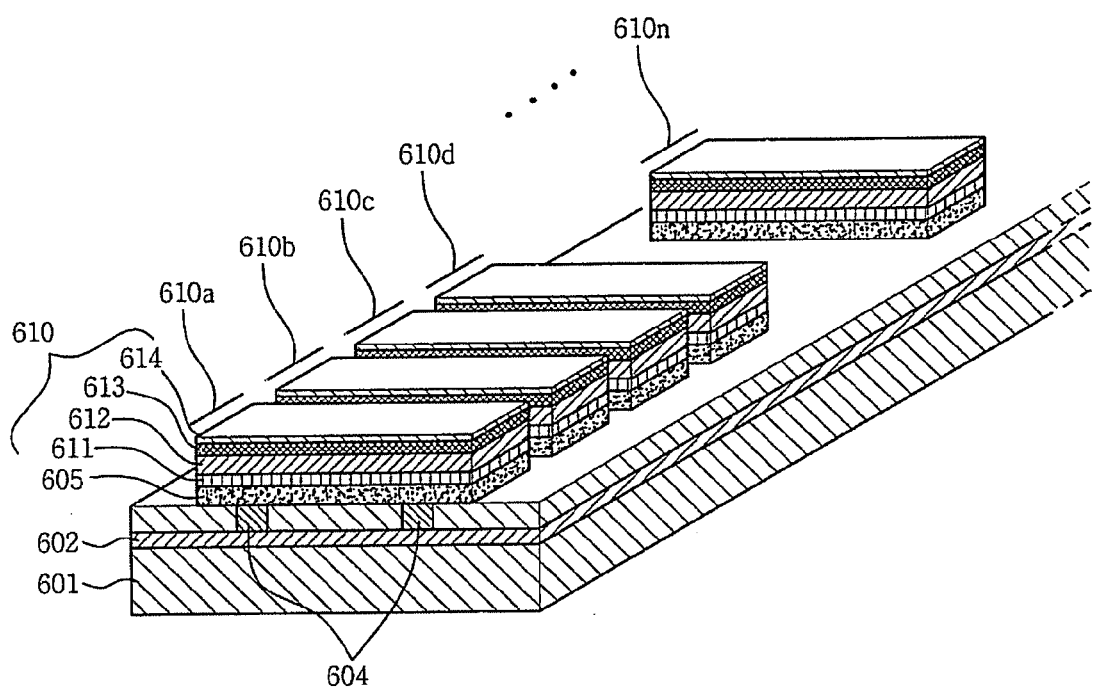

Referring to FIG. 6e, after such a mother body of a diffractive thin-film piezoelectric micromirror array is patterned using a mask layer, such as a photoresist, the micromirror 614, upper electrode 613, piezoelectric material 612, lower electrode 611, and lower supporter 605 are etched to form the diffractive thin-film piezoelectric micromirror array.

Usually, an etching process means that photosensitizer models formed through an exposing process are used as a mask and different chemical reactions are initiated between a portion under the mask and an exposed portion, thereby removing the portion which is not protected by the mask. Regions into which ions are to be diffused or implanted are determined, and connection between conducting wires is achieved by the etching process. The etching process may usually be classified into wet and dry etching processes. The wet etching process is isotropically carried out, and is a most widely used etching process in a semiconductor process. It is mostly applied to grind a surface of a cut wafer, to wash a wafer before a thermally oxidized thin-film or an epitaxial layer is grown, and to fabricate a semiconductor device having a minimum wire width of 3 µm or more. Reacted chemical materials are provided on a surface of a substrate which is to be etched, chemical reactions are initiated at the surface, and products are separated from the substrate, thereby completing the wet etching process.

Meanwhile, the dry etching process is achieved by a physical process adopting an ion impact to a surface of a wafer, a chemical process of reactants conducted in a plasma, another chemical process initiated by ions, electrons, photons and the like, or a physicochemical process. The dry etching process is mostly known as a plasma-assist etching process. The dry etching process is classified into an ion etching process as a physical etching process, and a reaction etching process as a chemical or a physicochemical etching process.

In the case of the physical etching process, when ions collide with an object material after movement of the ions is accelerated by an electric field, surface abrasion is caused by momentum transfer. The physical etching process is exemplified by ion beam etching and RF etching processes. The chemical dry etching process provides reactant species generated by a plasma to a surface of a substance to be etched, causing a chemical reaction between the reactant species and atoms constituting the substance, resulting in generation of volatile gases, thereby achieving the etching. In the physicochemical dry etching process, ions, electrons, photons or the like collide with a surface of a material which is to be etched through a physical method, such as acceleration by an electric field, causing a chemical reaction, resulting in generation of volatile gases, thereby achieving the etching. In this respect, the ions may act as reactants. A plasma etching in a parallel-plate reaction furnace, a reaction ion or a reaction sputter etching, a reaction ion beam milling, a chemical dry etching caused by electrons or photons and the like belong to the physicochemical dry etching process.

Figure 6F:
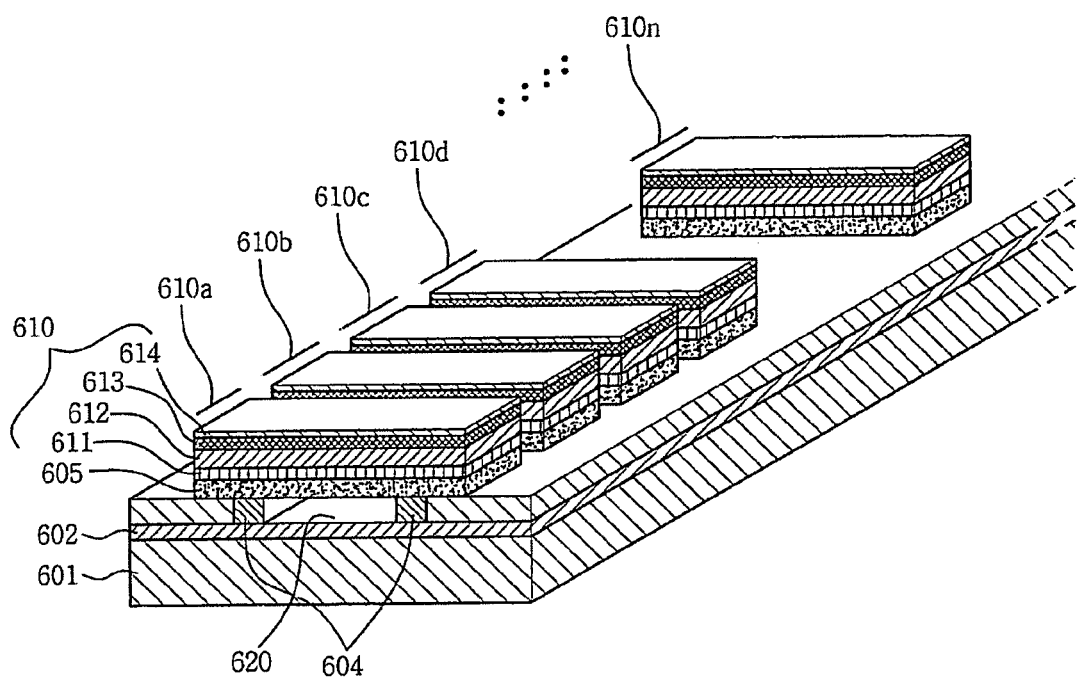

Referring to FIG. 6f, a sacrificial layer 620 is etched, resulting in formation of a cavity in a space from which the sacrificial layer 620 is removed, thereby making vertical movement of a diffractive thin-film piezoelectric micromirror possible.

Heretofore, there has been described removal of the sacrificial layer 620 after the diffractive thin-film piezoelectric micromirror array is formed from a mother body of the diffractive thin-film piezoelectric micromirror array, but the micromirror array may be formed after the sacrificial layer 620 is removed.

In other words, after the sacrificial layer 620 is etched in the mother body of the diffractive thin-film piezoelectric micromirror array, the mother body of the diffractive thin-film piezoelectric micromirror array is patterned using a mask layer, such as a photoresist, and the micromirror 614, upper electrode 613, piezoelectric material 612, lower electrode 611, and lower supporter 605 are etched to form the micromirror array.

FIGS. 7a to 7g illustrate fabrication of a diffractive thin-film piezoelectric micromirror having a recess according to an embodiment of the present invention. The method of producing the diffractive thin-film piezoelectric micromirror having the recess according to the second embodiment of the present invention as shown in FIGS. 7a to 7g is different from the method of FIGS. 6a to 6f in that a piezoelectric layer of the diffractive thin-film piezoelectric micromirror is positioned on a cavity. Accordingly, it is necessary to etch a portion of the piezoelectric layer 710, under which the cavity is not formed, before a sacrificial layer 720 is removed, so as to produce the above diffractive thin-film piezoelectric micromirror.

Figure 7A:
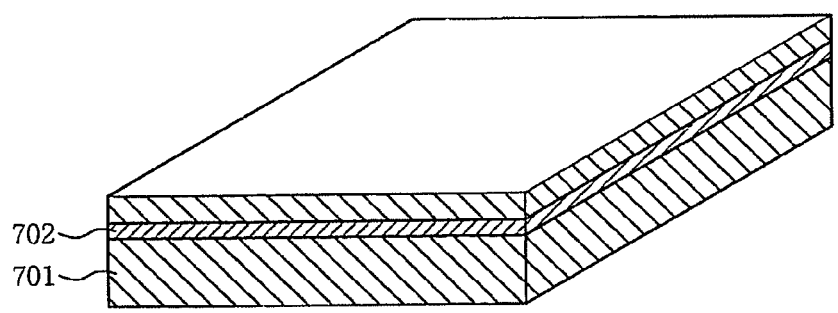
FIGS. 7a to 7g illustrate fabrication of a diffractive thin-film piezoelectric micromirror having a recess.

With reference to FIG. 7a, a silicon wafer 701 is prepared, and an insulating layer 702 is formed in such a way that the insulating layer occupies a space ranging from a first position, which is deep from a surface of the silicon wafer so as to form a cavity between the first position and the surface, to a second position that is deeper than the first position by a predetermined depth according to an ion implantation process.

Figure 7B:
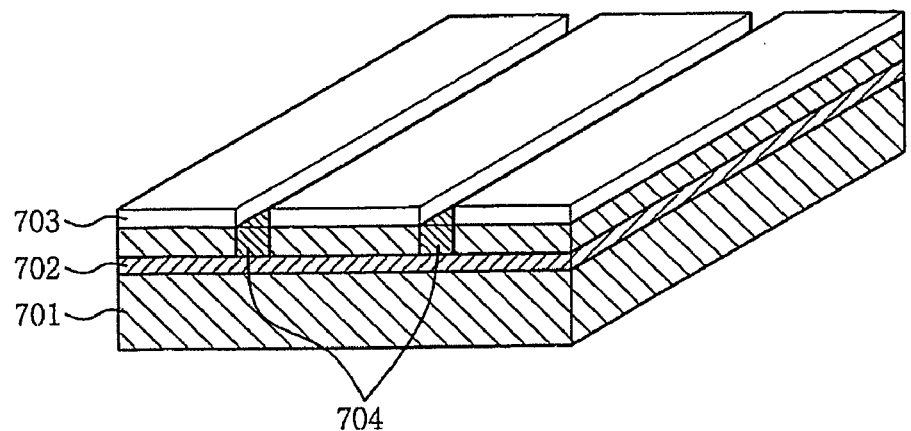

Referring to FIG. 7b, an ion exposure mask 703 having both sides exposed is laminated on the silicon wafer 701 to form oxidized walls defining both boundaries of a width of the cavity.

Oxygen ions are implanted through only the exposed sides of the ion exposure mask 703 to form desired boundaries of the cavity, thereby forming the oxidized walls 704 as shown in FIG. 7b. In the specification of the present invention, the formation of the oxidized walls 704 employing the implantation of an oxidizing agent is disclosed, but alternatively the oxidized wall may be formed through an oxidation process using water and oxygen at high temperatures. Additionally, this alternative oxidation process is preferable because it is more competitive in terms of costs than the oxidant implantation process.

Figure 7C:
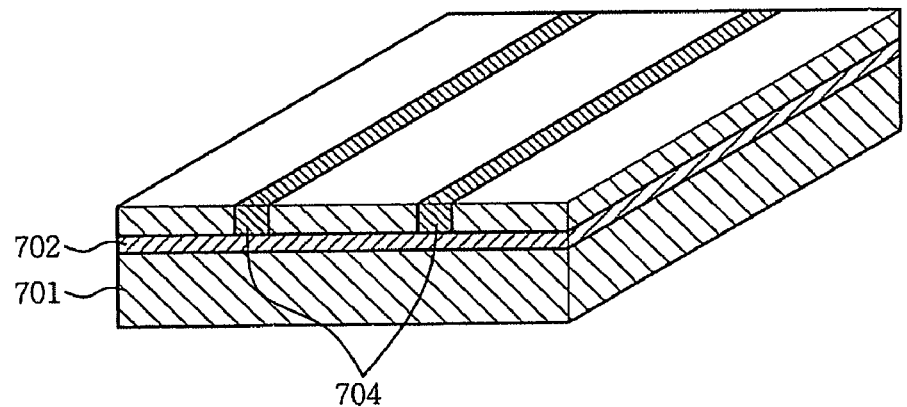

Referring to FIG. 7c, after the ion implantation is completed using an ion implanter to form the desired oxidized walls 704 on the silicon wafer 701, the ion exposure mask 703 is removed.

Figure 7D:
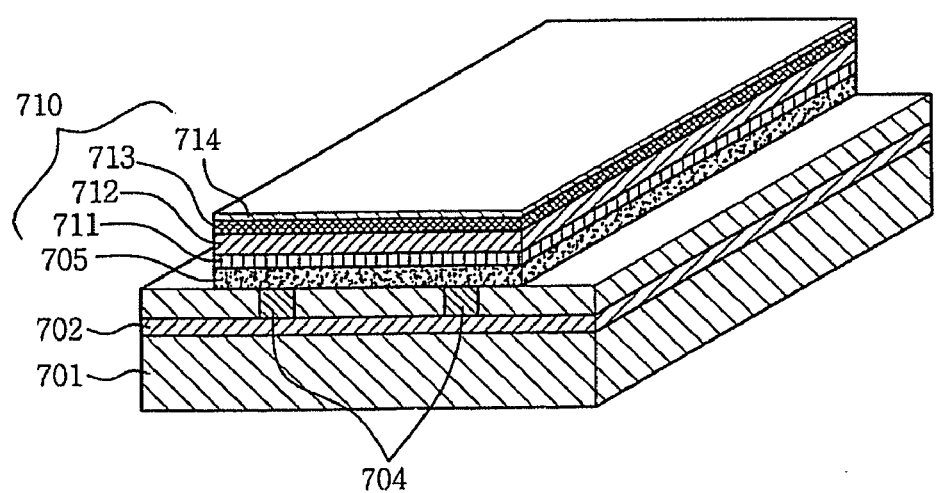

Referring to FIG. 7d, a lower supporter 705 for supporting the piezoelectric material is deposited on the silicon wafer 701, and a piezoelectric layer 710 is deposited on the lower supporter 705. In this respect, a lower electrode 711 constituting the piezoelectric layer 710 is formed, a piezoelectric material 712 is formed on the lower electrode 711, an upper electrode 713 is formed on the piezoelectric material 712, and a micromirror 714 is attached to an upper side of the upper electrode 713.

Figure 7E:
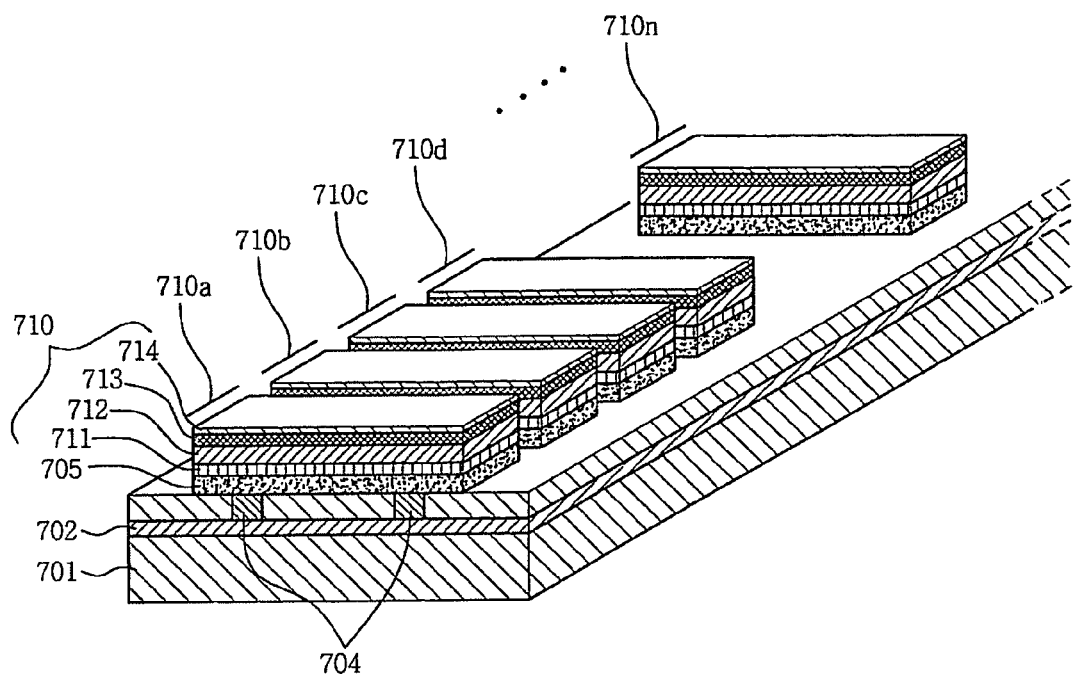

Referring to FIG. 7e, after a mother body of a diffractive thin-film piezoelectric micromirror array is patterned using a mask layer, such as a photoresist, the micromirror 714, upper electrode 713, piezoelectric material 712, lower electrode 711, and lower supporter 705 are etched to form the diffractive thin-film piezoelectric micromirror array.

Figure 7F:
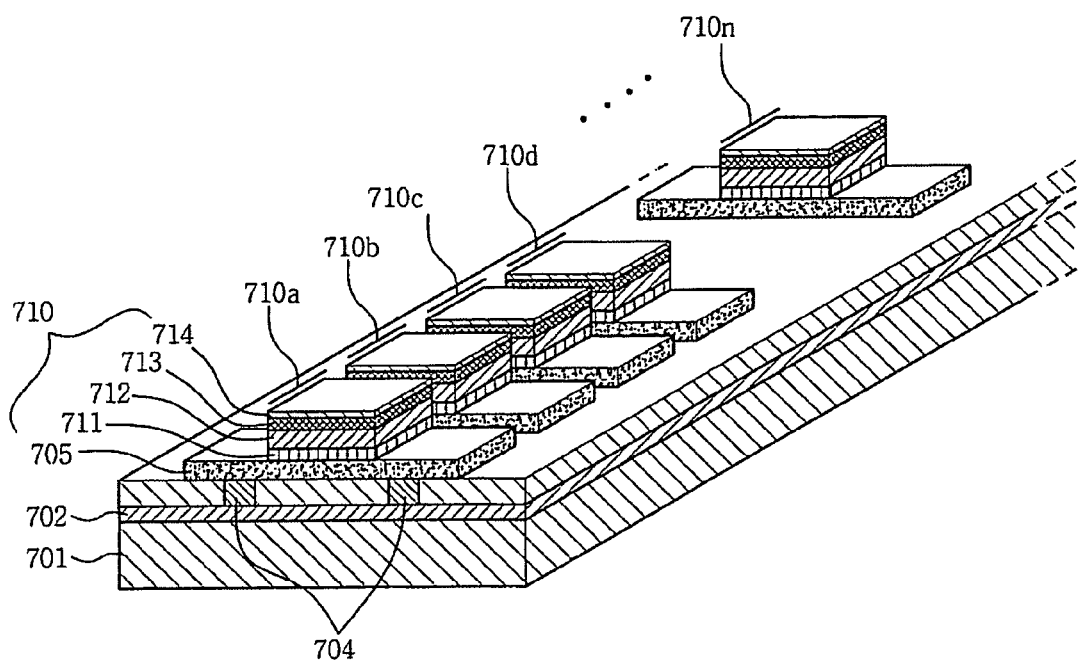

Referring to FIG. 7f, a portion of the piezoelectric layer 710 under which the cavity is not formed is removed, and thus, the piezoelectric layer 710 is positioned on only the cavity.

Figure 7G:
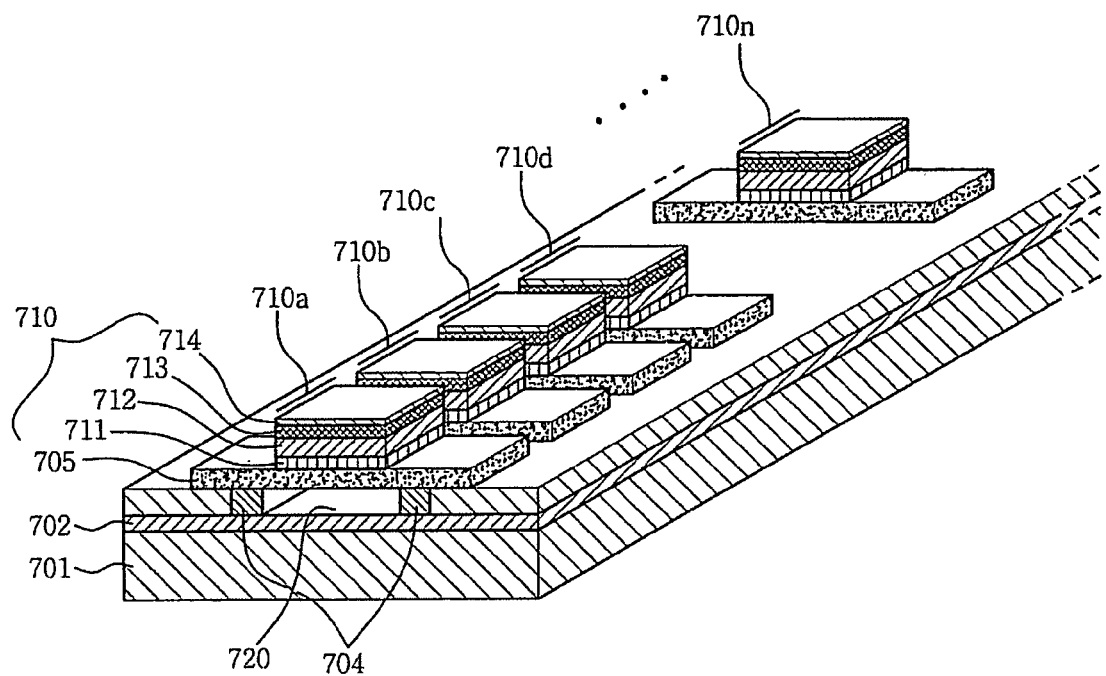

Referring to FIG. 7g, a sacrificial layer 720 is etched, resulting in formation of the cavity in a space from which the sacrificial layer 720 is removed, thereby making vertical movement of the diffractive thin-film piezoelectric micromirror possible.

Heretofore, there has been described the removal of the sacrificial layer 720 after the diffractive thin-film piezoelectric micromirror array is formed from the mother body of the diffractive thin-film piezoelectric micromirror array, but the micromirror array may be formed after the sacrificial layer 720 is removed.

In other words, after the sacrificial layer 720 is etched in the mother body of the diffractive thin-film piezoelectric micromirror array, the mother body of the diffractive thin-film piezoelectric micromirror array is patterned using a mask layer, such as a photoresist, and the micromirror 714, upper electrode 713, piezoelectric material 712, lower electrode 711, and lower supporter 705 are etched to form the micromirror array.

FIGS. 8a to 8h illustrate fabrication of a diffractive thin-film piezoelectric micromirror having a recess according to an embodiment of the present invention. The method of producing the diffractive thin-film piezoelectric micromirror having the recess according to the third embodiment of the present invention as shown in FIGS. 8a to 8h is different from the method of FIGS. 6a to 6f in that a piezoelectric layer of the diffractive thin-film piezoelectric micromirror is positioned on portions positioned to the left and right of a cavity. Accordingly, it is necessary to etch a portion of the piezoelectric layer 810, under which the cavity is formed, before a sacrificial layer 820 is removed, so as to produce the above diffractive thin-film piezoelectric micromirror.

Figure 8A:
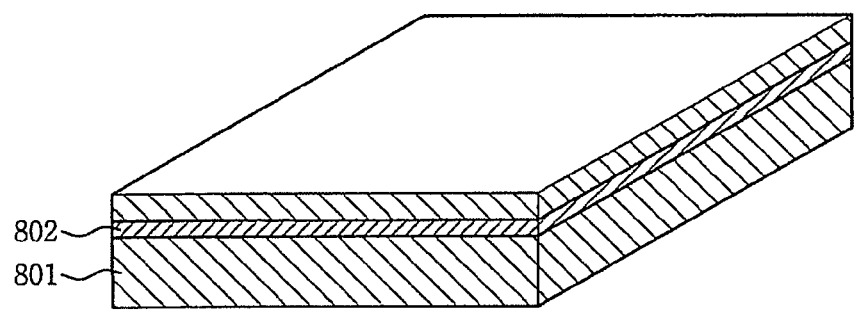
FIGS. 8a to 8h illustrate fabrication of a diffractive thin-film piezoelectric micromirror having a recess.

With reference to FIG. 8a, a silicon wafer 801 is prepared, and an insulating layer 802 is formed in such a way that the insulating layer occupies a space ranging from a first position, which is deep beneath a surface of the silicon wafer so as to form a cavity between the first position and the surface, to a second position that is deeper than the first position by a predetermined depth according to an ion implantation process.

Figure 8B:
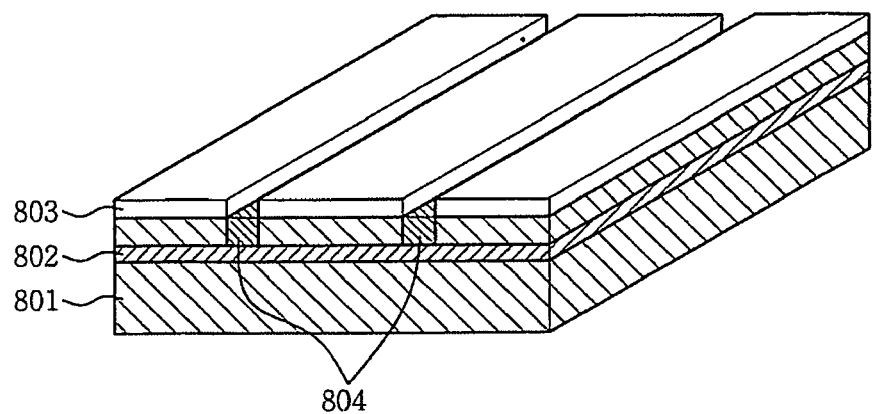

Referring to FIG. 8b, an ion exposure mask 803 having both exposed sides is laminated on the silicon wafer 801 to form oxidized walls defining both boundaries of a width of the cavity.

Oxygen ions are implanted through only the exposed sides of the ion exposure mask 803 to form desired boundaries of the cavity, thereby forming the oxidized walls 804 as shown in FIG. 8b. In the specification of the present invention, the formation of the oxidized walls 804 employing the implantation of an oxidizing agent is disclosed, but alternatively the oxidized wall may be formed using an oxidation process using water and oxygen at high temperatures. Additionally, this alternative oxidation process is preferable because it is more competitive in terms of costs than the oxidant implantation process.

Figure 8C:
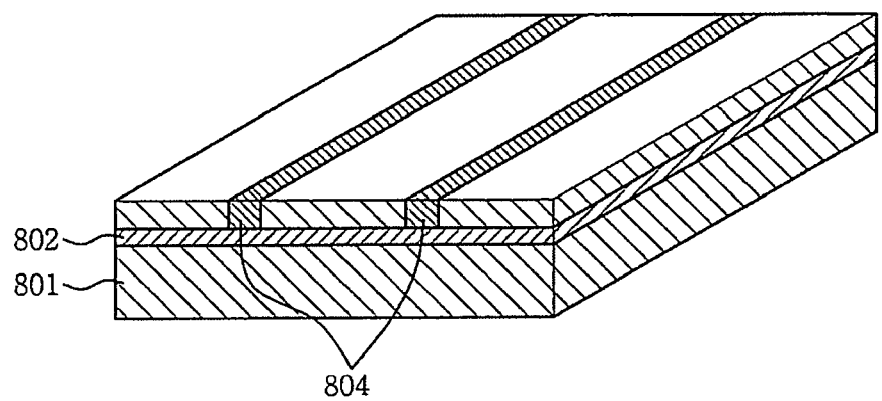

Referring to FIG. 8c, after the ion implantation is completed using an ion implanter to form the desired oxidized walls 804 on the silicon wafer 801, the ion exposure mask 803 is removed.

Figure 8D:
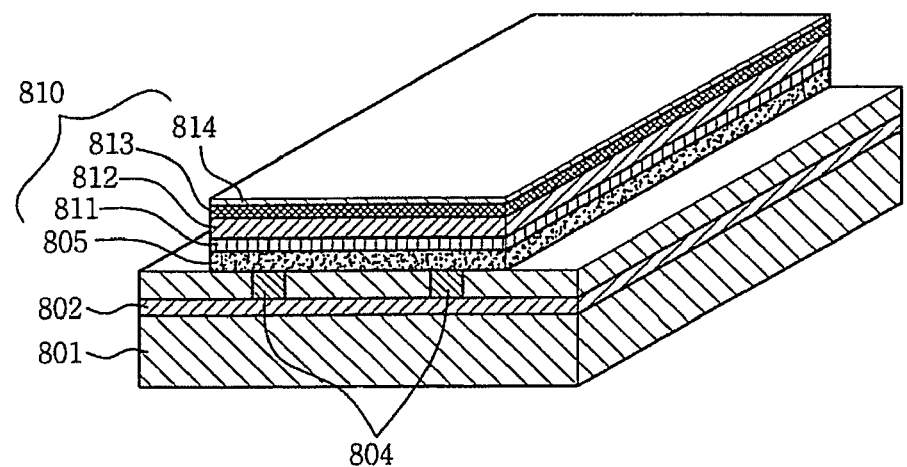

Referring to FIG. 8d, a lower supporter 805 for supporting the piezoelectric material is deposited on the silicon wafer 801, and a piezoelectric layer 810 is deposited on the lower supporter 805. In this respect, a lower electrode 811 constituting the piezoelectric layer 810 is formed, a piezoelectric material 812 is formed on the lower electrode 811, and an upper electrode 813 is formed on the piezoelectric material 812. At this time, it is not necessary to conduct attachment of a micromirror because a portion of the piezoelectric layer 801 positioned on the cavity is removed and a micromirror 830 is formed on the upper supporter 805.

Figure 8E:
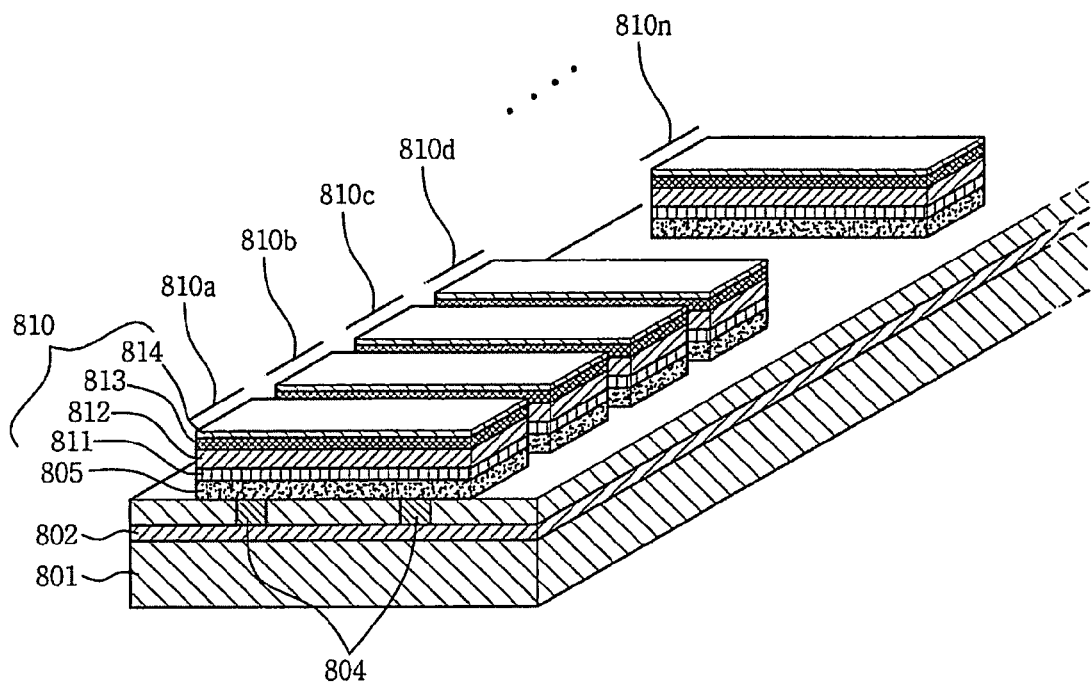

Referring to FIG. 8e, after a mother body of a diffractive thin-film piezoelectric micromirror array is patterned using a mask layer, such as a photoresist, the upper electrode 813, piezoelectric material 812, lower electrode 811, and lower supporter 805 are etched to form the diffractive thin-film piezoelectric micromirror array.

Figure 8F:
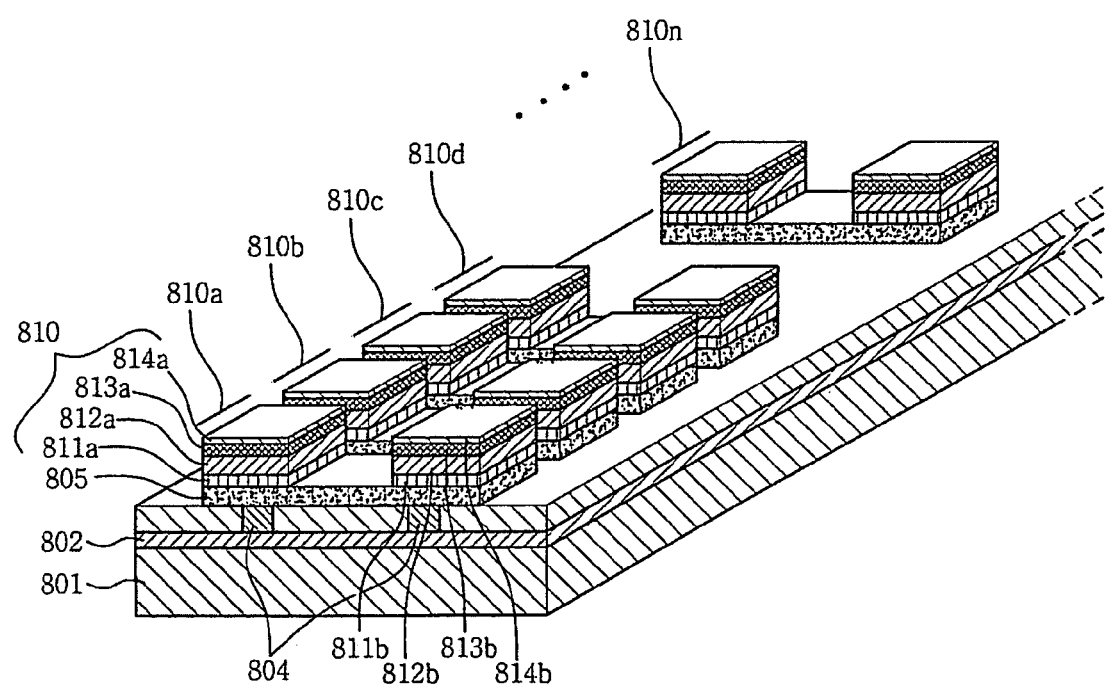

Referring to FIG. 8f, a portion of the piezoelectric layer 810 under which the cavity is formed is removed, and thus, the piezoelectric layer 810 is positioned on only portions to the left and right of the cavity.

Figure 8G:
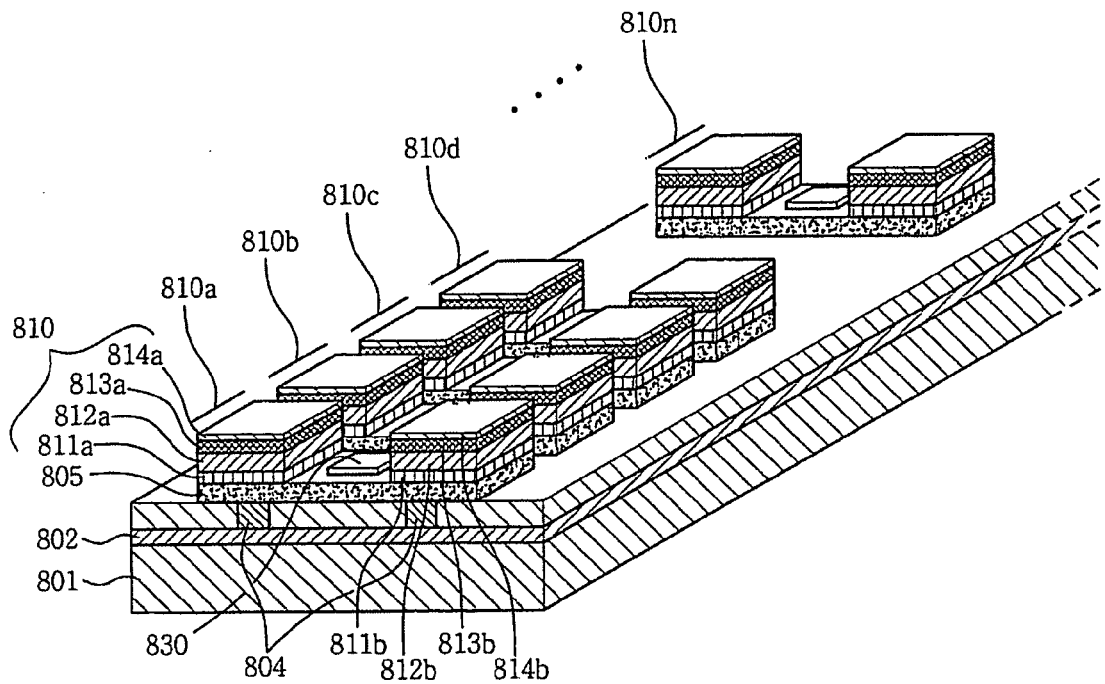

Referring to FIG. 8g, the micromirror 830 is laminated on a portion of an upper side of the lower supporter 805, from which the piezoelectric layer 810 is removed, to reflect incident light. In the specification, the lamination of the micromirror 830 on only the cavity is described, but the micromirror may be laminated on an entire upper side of the piezoelectric layer 810.

Figure 8H:
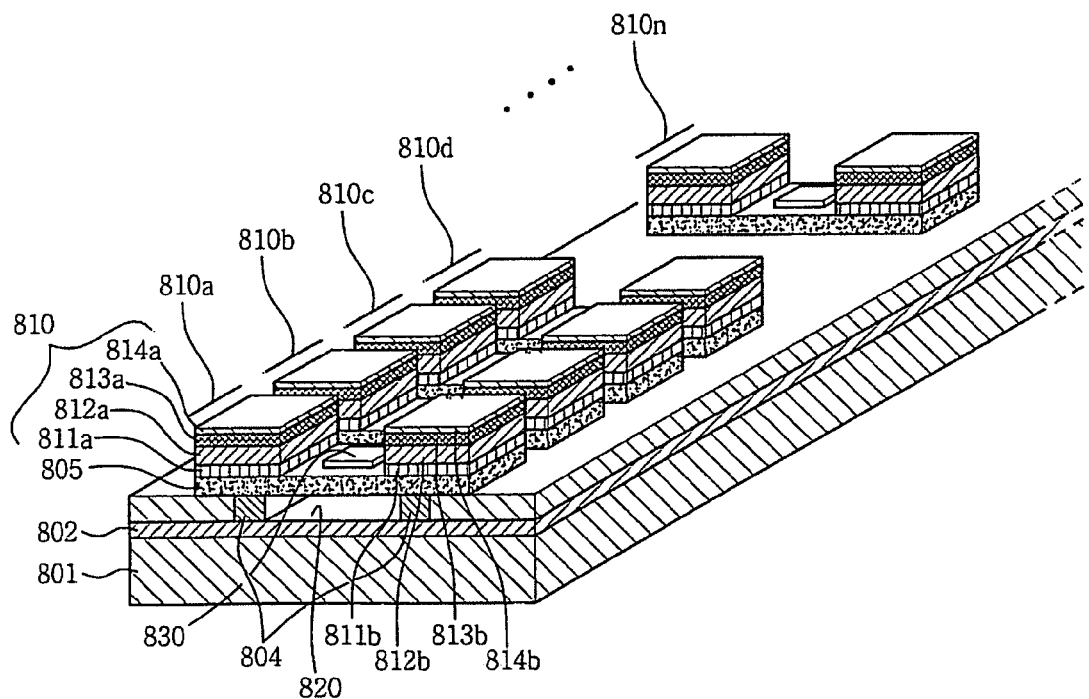

Referring to FIG. 8h, the sacrificial layer 820 is etched, resulting in formation of the cavity in a space from which the sacrificial layer 820 is removed, thereby making vertical movement of the diffractive thin-film piezoelectric micromirror possible.

Heretofore, there has been described the removal of the sacrificial layer 820 after the diffractive thin-film piezoelectric micromirror array is formed from the mother body of the diffractive thin-film piezoelectric micromirror array, but the micromirror array may be formed after the sacrificial layer 820 is removed.

In other words, after the sacrificial layer 820 is etched in the mother body of the diffractive thin-film piezoelectric micromirror array, the mother body of the diffractive thin-film piezoelectric micromirror array is patterned using a mask layer, such as a photoresist, and the upper electrode 813, piezoelectric material 812, lower electrode 811, and lower supporter 805 are etched to form the micromirror array.

As described above, the present invention adopts an oxygen ion implantation process to form a cavity, thereby defining a depth of the cavity at 0.5 µm or less and a width of the cavity as desired.

The production of a diffractive thin-film piezoelectric micromirror according to the present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A diffractive thin-film piezoelectric micromirror, comprising:
    a substrate comprising portions defining a longitudinal groove formed in said substrate, said groove having walls lateral to a bottom of said groove; and a piezoelectric mirror layer which has a ribbon shape, is attached to the substrate along both ends of the groove at both ends thereof while being spaced from the bottom of the groove at an intermediate portion thereof, the intermediate portion of the piezoelectric mirror layer being movable away from and toward the groove when a voltage is applied thereto, and diffracts an incident light beam.

2. The diffractive thin-film piezoelectric micromirror as set forth in claim 1, further comprising a lower supporter layer which has a ribbon shape, is attached to the substrate to span the groove, while being spaced from the bottom of the groove at an intermediate portion thereof, the center portion of the piezoelectric micromirror being movable away from and toward the groove, and the piezoelectric mirror layer being disposed on the supporter layer.

3. The diffractive thin-film piezoelectric micromirror as set forth in claim 1 wherein the substrate walls are implanted with ions.

4. The diffractive thin-film piezoelectric mirror as set forth in claim 3, wherein the ions comprise oxygen ions.

5. The diffractive thin-film piezoelectric mirror as set forth in claim 1, wherein the oxygen ions are implanted into the walls with an oxidizing agent or by a water and oxidization process.

6. A diffractive thin-film piezoelectric micromirror, comprising:
   a substrate on which a groove having walls lateral to a bottom thereof is longitudinally formed thereof;
   a piezoelectric mirror layer which has a ribbon shape, is attached to the substrate along both ends of the groove at both ends thereof while being spaced from the bottom of the groove at an intermediate portion thereof, the intermediate portion being movable away from and toward the groove when a voltage is applied thereto, and diffracts an incident light beam; and
   wherein the piezoelectric mirror layer comprises:
      a first electrode layer which has a ribbon shape, is positioned on the substrate to span the groove while being spaced from the bottom of the groove of the substrate at an intermediate portion thereof, and provides a first piezoelectric voltage;
      a piezoelectric material layer which is disposed on the first electrode layer, and shrunken and expanded so as to be moved when a voltage is applied thereof; and
      an electrode and mirror layer which is disposed on the piezoelectric material layer, provides a second piezoelectric voltage to the piezoelectric material layer, and diffracts the incident light beam.

7. The diffractive thin-film piezoelectric micromirror as set forth in claim 6, wherein the electrode and mirror layer comprises:
   a second electrode layer which is disposed on the piezoelectric material layer and provides the second piezoelectric voltage to the piezoelectric material layer; and
   a micromirror layer which is disposed on the second electrode layer and reflects the incident light beam.

8. A diffractive thin-film piezoelectric micromirror, comprising:
   a substrate within which a longitudinal groove is formed, said groove having walls transverse to a bottom of said groove;
   a support layer which has a ribbon shape, is attached to the substrate to span the groove while being spaced from the bottom of the groove at an intermediate portion thereof, the an intermediate portion of the support layer being movable toward and away from the groove; and
   a piezoelectric mirror layer which is disposed on the support layer so as to be positioned over the groove of the substrate at both ends thereof, the both end portions of the piezoelectric mirror layer, which are spaced from the groove, being movable when a voltage is applied thereto, and diffracts an incident light beam.

9. A diffractive thin-film piezoelectric micromirror, comprising:
   a substrate on which a groove having walls transverse to a bottom thereof is longitudinally formed thereof;
   a support layer which has a ribbon shape, is attached to the substrate to span the groove while being spaced from the bottom of the groove at an intermediate portion thereof, the intermediate portion being movable toward and away from the groove; and
   a piezoelectric mirror layer which is disposed on the support layer so as to be positioned over the groove of the substrate at both ends thereof, the both end portions of the piezoelectric mirror layer, which are spaced from the groove, being movable when a voltage is applied thereto, and diffracts an incident light beam, wherein the piezoelectric mirror layer comprises:
      a first electrode layer which is disposed on the support layer so as to be positioned on the groove of the substrate at both ends thereof and provides a first piezoelectric voltage;
      a piezoelectric material layer which is disposed on the first electrode layer, and shrunken and expanded so as to be moved when a voltage is applied to both sides thereof; and
      an electrode and mirror layer which is disposed on the piezoelectric material layer, provides a second piezoelectric voltage to the piezoelectric material layer, and diffracts the incident light beam.

10. The diffractive thin-film piezoelectric micromirror as set forth in claim 9, wherein the electrode and mirror layer comprises:
    a second electrode layer which is disposed on the piezoelectric material layer and provides the second piezoelectric voltage to the piezoelectric material layer; and
    a micromirror layer which is disposed on the second electrode layer and reflects the incident light beam.

11. A diffractive thin-film piezoelectric micromirror, comprising:
    a substrate defining a groove formed therein and extending longitudinally formed thereof;
    a support layer which has a ribbon shape and is attached to the substrate to span the groove while being spaced from the bottom of the groove of the substrate at an intermediate portion thereof;
    a first piezoelectric layer which is positioned at a first end portion of the support layer at an end thereof and at a location spaced from an intermediate portion of the support layer a predetermined distance, and shrunken and expanded so as to be moved toward and away from the groove when a voltage is applied thereto;
    a second piezoelectric layer which is positioned at the other end portion of the support layer at an end thereof and at a location spaced from the center of the lower supporter by a predetermined distance, and shrunken and expanded so as to be moved toward and away from the groove when a voltage is applied thereto; and
    a micromirror layer which is positioned at the intermediate position of the support layer and diffracts an incident light beam.

12. The diffractive thin-film piezoelectric micromirror as set forth in claim 11, wherein:

the first piezoelectric layer comprises:
- a first electrode layer which has a ribbon shape, is positioned at a first end portion of the support layer at an end thereof and at a location remote from an intermediate portion of the support layer toward the end of the support layer by a predetermined distance at the other end thereof, and provides a first piezoelectric voltage;
- a first piezoelectric material layer which is positioned on the first electrode layer, is positioned at the end of the support layer at an end thereof and at the location remote from the intermediate portion of the support layer toward the end of the support layer by a predetermined distance at the other end thereof, and is shrunken and expanded so as to be moved when a voltage is applied to both sides thereof; and
- a second electrode layer which is positioned on the first piezoelectric material layer, is positioned at an end of the support layer at an end thereof and at the location remote from an intermediate portion of the support layer toward the end of the support layer by a predetermined distance at the other end thereof, and provides a second piezoelectric voltage, and the second piezoelectric layer comprises:
- a third electrode layer which has a ribbon shape, is positioned at the other end of the support layer at an end thereof and at a location remote from an intermediate portion of the support layer toward the other end of the support layer by a predetermined distance at the other end thereof and provides a third piezoelectric voltage;
- a second piezoelectric material layer which is positioned on the third electrode layer, is positioned at the other end of the support layer at an end thereof and at a location remote from an intermediate portion of the support layer toward the other end of the support layer by a predetermined distance at the other end thereof, and is shrunken and expanded so as to be moved when a voltage is applied to opposite sides thereof; and
- a fourth electrode layer which is positioned on the second piezoelectric material layer, is positioned at the other end portion of the support layer at an end thereof and at a location remote from the an intermediate portion of the support layer toward the other end of the support layer by a predetermined distance at the other end thereof, and provides a fourth piezoelectric voltage.

* * * * *